United States Patent [19]

Abbes et al.

[11] 4,427,222
[45] Jan. 24, 1984

[54] DEVICE FOR THE TIGHT JOINING OF TWO PARTS

[75] Inventors: Claude Abbes, Saint Etienne; Christian Rouaud; Robert Piednoir, both of Bourg Saint Andeol; Raymond De Villepoix, Donzère, all of France

[73] Assignee: Commissariat a l'Energie Atomique, Paris, France

[21] Appl. No.: 338,992

[22] Filed: Jan. 12, 1982

[30] Foreign Application Priority Data

Jan. 23, 1981 [FR] France .............................. 81 01250

[51] Int. Cl.³ .................. F16L 19/00; F16L 23/00; F16L 35/00
[52] U.S. Cl. ..................................... 285/353; 285/368; 285/18; 285/39; 138/89
[58] Field of Search ................ 285/353, 354, 368, 39, 285/18; 138/89

[56] References Cited

U.S. PATENT DOCUMENTS

| 1,783,410 | 12/1930 | Cowell | 285/353 X |
| 2,165,051 | 7/1939 | Hering | 285/368 X |
| 2,328,898 | 9/1943 | Goff et al. | 285/368 X |
| 3,103,956 | 9/1963 | Focht | 285/368 X |
| 4,124,230 | 11/1978 | Ahlstone | 285/18 |
| 4,150,477 | 4/1979 | Orr | 285/18 X |

FOREIGN PATENT DOCUMENTS

| 342721 | 7/1904 | France . |
| 990820 | 6/1951 | France . |
| 1047939 | 7/1953 | France . |
| 2073318 | 10/1971 | France . |
| 271379 | 5/1927 | United Kingdom . |

Primary Examiner—Richard J. Scanlan, Jr.
Attorney, Agent, or Firm—Kerkam, Stowell, Kondracki & Clarke

[57] ABSTRACT

The invention relates to a device for the tight joining of two parts comprising tightening means of the screw-nut type compressing a gasket between the two parts.

A compression part and an elastic O-ring constituted by an internal spring with contiguous turns, which is closed on itself and fitted into at least one envelope are placed between the tightening means and one of the parts in order to permit the tightening of the assembly by an auxiliary system, followed by the tensioning of the tightening means by elastic restoration of the ring after fitting tightening means and slackening or releasing the auxiliary system.

Application to the joining of two pipes and to the sealing of a container by means of a plug.

8 Claims, 5 Drawing Figures

DEVICE FOR THE TIGHT JOINING OF TWO PARTS

BACKGROUND OF THE INVENTION

The present invention relates to a device for joining by elastic tightening. More specifically, the invention relates to the joining by means of a tight device of two parts comprising tightening means of the screw-nut type which move the parts to be joined towards one another in order to compress a gasket between these parts.

In such a device, the tightening means can in particular be constituted by bolts or two ring-shaped parts cooperating by means of a thread, depending on whether the parts to be joined have a large or small diameter. Generally, existing joining devices are assembled by operating the tightening means in accordance with a tightening range adapted to the mechanical characteristics of the gasket used. For this purpose, either a manual torque wrench or a preset, semi-automatic mechanical spanner is used. The final tightening torque is usually obtained after the spanner has carried out a number of turns of each bolt. During this operation, the tensile stresses in the bolts balance the compressive stresses in the flanges.

This widely used method is economic, but is also irksome and relatively inaccurate, because a large proportion of the forces used serve to overcome friction beneath the head and at the threads. When the use conditions impose a precise tightening or when the consequences of jamming of the nuts and bolts may be serious, it is necessary to employ more sophisticated methods.

BRIEF SUMMARY OF THE INVENTION

The present invention relates to the construction of a tight joining device making it possible to eliminate the disadvantages of the prior art joining devices. Thus, the device according to the invention makes it possible to carry out a particularly accurate tightening operation, without overcomplicating its construction.

To this end, the present invention proposes a device for the tight joining of two parts comprising tightening means of the screw-nut type, which move the parts to be joined towards one another in order to compress at least one gasket between said parts, wherein the tightening means act on a stack comprising, in order and in axial direction, relative to the parts to be joined, the first of the said parts, the gasket, the second of the parts to be joined, elastic means and a compression member, the rigidity of the elastic means being at least equal to that of the gasket, in such a way that said stack can be tightened with the aid of ancillary compression means prior to the fitting of the tightening means, said elastic means compensating the tensioning of the tightening means during the slackening of the auxiliary compression means.

Preferably, the elastic means comprise at least one elastic O-ring.

As a result of these characteristics, the stack constituted by the compression member, the elastic means, the two parts to be joined and the gasket can be tightened by an auxiliary compression device prior to fitting the tightening means. The total compressive stress applied by this auxiliary compression device is initially calculated to take account of both the tightening force which it is finally desired to apply, whilst taking account of the mechanical characteristics of the gasket and the stress which will then result from the tensioning of the tightening means after their fitting and after the auxiliary compressive device has been removed. The tightening means can then be manually fitted and the compression device is then slackened in such a way that the tightening force is transferred to the tightening means. Accompanied by a slight relaxation, the elastic means then compensate the tensioning of the tightening means and at the gasket maintain the specified tightening necessary as a function of the conditions of use. Moreover, the use of an elastic O-ring makes it possible to provide joining devices of all types and dimensions. Thus, the reduced overall dimensions and performance characteristics of a ring of this type make it possible to use a tight joining device in all industrial contexts ranging from the joining of small diameter ducts to large diameter bolted assemblies. Such a joining device also makes it possible to considerably reduce the risks of jamming. Finally, this joining device is particularly advantageous when the area surrounding the assembly does not make it possible to use spanners or wrenches or when the torsional stresses which would result from their use are unacceptable in the pipes and tubes.

According to a first embodiment of the invention, which is particularly appropriate for the joining of medium and large diameter parts, the tightening means comprise bolts passing through appropriate passages formed in the compression part and in at least one of the parts to be joined. The joining device can then comprise either a single elastic means arranged coaxially to the gasket, or several elastic means arranged coaxially around each bolt, as a function of whether the parts to be joined have a large or only a medium-sized diameter.

According to a second embodiment of the invention, more particularly usable in the case of smaller diameter parts to be joined, the tightening means comprise two annular parts, which cooperate with one another by a thread, and the joining device comprises a single elastic means, the annular parts and the elastic means being arranged coaxially with respect to the gasket.

Finally, according to a third embodiment of the invention, also appropriate to the joining of smaller diameter parts, the tightening means comprise an annular part, which cooperates by a thread with one of the parts to be joined and the joining device comprises a single elastic means, the annular part and the elastic means being arranged coaxially with respect to the gasket.

BRIEF DESCRIPTION OF THE DRAWINGS

The invention is described in greater detail hereinafter relative to non-limitative embodiments and the attached drawings, wherein show:

FIG. 3 a longitudinal sectional view of a device for the tight joining of a plug to a container, the left and right-hand parts of the drawing showing two different embodiments of the device according to the invention, particularly adapted to cases where the diameter of the orifice to be sealed is large and small respectively.

FIG. 4 a graph showing the curves relative to the variation of the tightening force Y as a function of the flattening e, curve a being the characteristic curve of the gasket, curve b the characteristic curve of the elastic O-ring and curve c and d the characteristic compression and decompression curves of the joint and the O-ring.

DETAILED DESCRIPTION OF THE PREFERRED EMBODIMENTS

Figure 1:
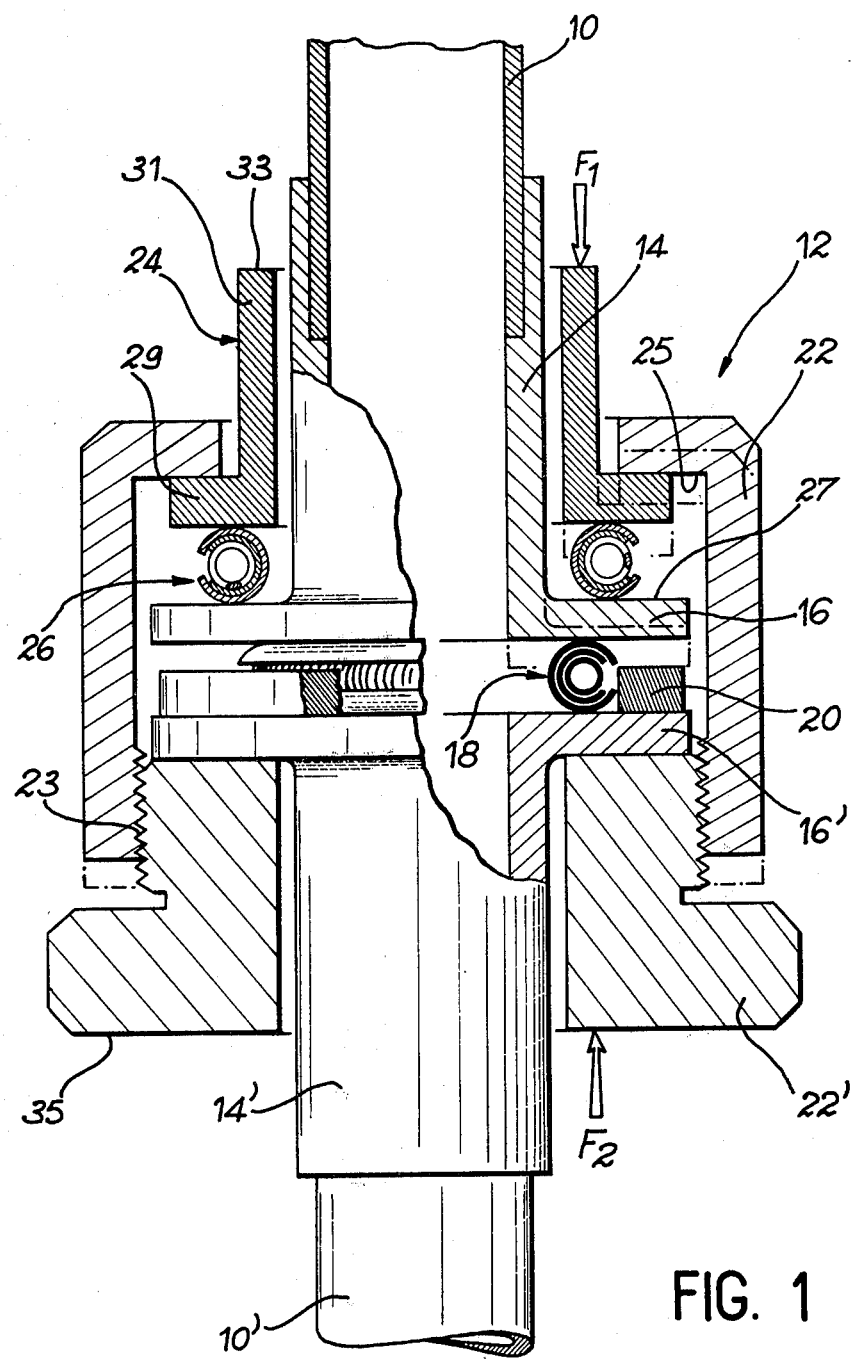
FIG. 1 a partial longitudinal sectional view of a first embodiment of the tight joining device according to the invention, particularly suitable for the connection of two small diameter ducts.

FIG. 1 shows two small diameter ducts 10, 10', sealingly connected by means of a device 12 constructed in accordance with the teachings of the present invention. To this end, each of the ducts 10, 10' is provided with an end fitting 14,14', whose end forms a flange 16, 16'. A gasket 18 of a random known type, is placed between the facing surfaces of flanges 16 and 16' and is centered relative to the common axis of the ducts by a projecting portion 20 of flange 16'. It will be seen that portion 20 is also used for limiting the flattening of gasket 18 during tightening. Gasket 18 can be a metal gasket of the type described and claimed in French Pat. No. 2,151,186 in the name of the Commissariat à l'Energie Atomique.

The tight joining device 12 also comprises tightening means of the nut-screw type which, in the embodiment of FIG. 1, comprise two parts 22, 22' having an annular shape and cooperating with one another by a thread 23. For this reason, this embodiment is particularly appropriate in the case where the diameter of the ducts is small.

According to the present invention, device 12 also comprises a compression part 24 and an elastic O-ring 26. More specifically, compression part 24 and O-ring 26 are placed in this order between the active face 25 of tightening part 22 and the rear face 27 of flange 16. Part 24 has an L-shaped cross-section, so as to define a radial portion 29 tightened between face 25 and elastic O-ring 26 and a tubular part 31 projecting to the exterior of the tightening part 22, so as to define a bearing face 33 at its end. Parallel to the common axis of ducts 10, 10', said bearing face 33 defines one of the ends of joining device 12, the other end of said device being defined by a face 35 formed on tightening parts 22' at its end opposite to that which bears against flange 16'.

In the embodiment of FIG. 1, the elastic O-ring 26 is constituted by a toroidal gasket of the type described and claimed in French Pat. No. 2,151,186 in the name of the Commissariat à l'Energie Atomique. However, O-ring 26 fulfils no sealing function and is in fact used as a return spring. This use is justified by the ease of adaptation of this type of joint, its reduced overall dimensions and its performance characteristics, which make it possible to use it in all types of joints.

As shown in FIG. 1, in the first embodiment of the invention, end fittings 14, 14', tightening parts 22, 22', gasket 18, compression part 24 and elastic O-ring 26 are arranged coaxially with respect to the common axis of ducts 10, 10'.

Figure 2A:
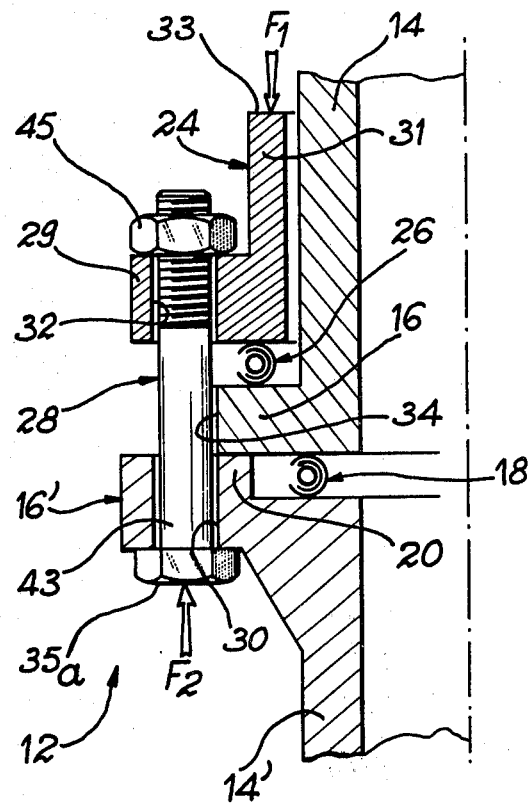
FIG. 2a a half-view in longitudinal section of a second embodiment of the joining device according to the invention, particularly appropriate then for the connection of two medium diameter ducts.
Figure 2B:
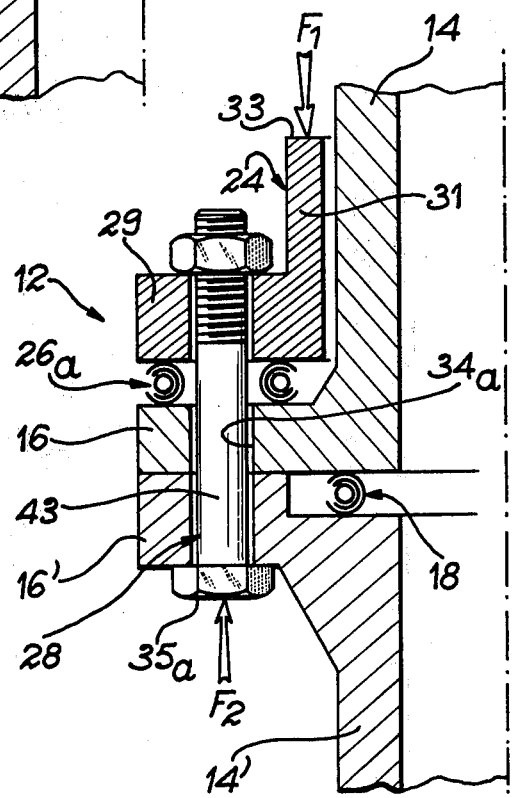
FIG. 2b a half-view comparable to FIG. 2a of a variant of the device shown in FIG. 2a particularly appropriate for the connection of two large diameter ducts.

The embodiment of FIG. 2b, which is more particularly appropriate for the case of a medium-sized diameter of the ducts, mainly differs from the previous embodiment through the tightening means no longer being constituted by two annular parts, but are instead constituted by bolts 28 regularly distributed around the ducts to be connected and whereof only one is shown in FIG. 2a. Each of the bolts 28 has a screw 43, which passes through a hole 30 formed in flange 16' and a hole 32 formed in radial portion 29 of compression part 24. Each bolt 28 has a nut 45, which bears on portion 29 of part 24, whereas the head of screw 43 bears on flange 16'. As in the previous embodiment, a gasket 18 is placed between flanges 16 and 16' of end fittings 14 and 14'. This joint is centered by a portion 20 of flange 16', which also makes it possible to limit the deformation of gasket 18. Moreover, according to the invention, an elastic O-ring 26 is placed between compression part 24 and flange 16. At the end of its tubular portion 31, part 24 also defines a bearing surface 33. At the other end of the joining device 12 shown in FIG. 2a, another bearing surface 35a is defined by the top of the head of screw 43.

In FIG. 2a, it is possible to see that each of the screws 43 also passes through an open slot 34 formed on the outer periphery of flange 16. However, it is apparent that slots 34 can be eliminated if the external diameter of flange 16 is reduced or can be replaced by holes if the diameter of said flange is increased.

As in the embodiment of FIG. 1, end fittings 14 and 14', gasket 18, compression part 24 and elastic O-ring 26 are arranged coaxially with respect to the common axis of the ducts to be joined.

FIG. 2b shows an embodiment similar to that of FIG. 2a, but which is particularly suitable for the case when the device according to the invention is used for tightly connecting two larger diameter ducts. In FIG. 2b, it is possible to see end fittings 14, 14' their flanges 16,16', gasket 18, tightening bolts 28 and compression part 24. However, this embodiment differs from that of FIG. 2a in that the single elastic O-ring 26 is replaced by several rings 26a of the same type and which are arranged coaxially around each of the bolts 28 and whereof only one is shown in the drawing. Each of the O-rings 26 is placed between the radial portion 29 of compression part 24 and flange 16, the latter being radially extended at the same level as portion 29, in such a way that the slot 34 of FIG. 2a is replaced by a hole 34a. As in the variant of FIG. 2a, end 33 of tubular portion 31 of part 24, as well as the top 25a of the head of each of the screws 43 define opposite bearing surfaces for the tight joining device 12.

The arrangement of FIG. 2b is justified in the case of joining larger diameter ducts, because the size would make a single elastic O-ring like ring 26 in FIG. 2a more costly than a plurality of smaller diameter rings of the type of the rings 26a in FIG. 2b.

The right and left-hand parts of FIG. 3 illustrate two embodiments of the device according to the invention similar to the embodiments of FIGS. 1 and 2a respectively, in the case where the said device is no longer used for joining two ducts, but instead serves to sealingly join a plug 14a and a container 14'a. Thus, as can be seen in FIG. 3, plug 14a comprises a centering portion 47, slightly penetrating the interior of opening 49 of container 14'a which it is desired to seal and a rim 51, which bears on a flange 16'a formed around opening 49. Here again, sealing is obtained by means of a gasket 18, which can be of the same type as the gaskets described with respect to the previous embodiments. Gasket 18 is compressed between rim 51 of plug 14a and flange 16'a. In the embodiments shown in the right-hand part of FIG. 3, the centering of joint 18 is brought about by means of a portion 52 of plug 14a, which also limits the deformation of the joint. In the embodiment shown in the left-hand part of FIG. 3, the same functions are fulfilled by a portion 20a of flange 16'a.

The embodiment shown in the right-hand part of FIG. 3 corresponds to the joining of a plug to a small size container. In this case, the tightening means comprise a single annular part 36, which directly cooperates with flange 16′a by means of a thread 38, said tightening part 36 also having a radial portion defining a surface 40 facing the peripheral rim 51 of plug 14a and flange 16′a.

According to the invention, a compression part 24a and an elastic O-ring 26 are arranged in this order between surface 40 of tightening part 36 and the peripheral flange 51 of plug 14a. However, unlike in the case of the compression parts used in the previously described duct joining devices, compression part 24a is in the form of a disk and defines a bearing surface 33a in the central portion of said disk. The opposite bearing surface of the joining device is constituted by the lower face 42 of flange 16′a. The centering of part 24a and of ring 26 are brought about by means of a projecting central portion 44, which also penetrates a slot 46 of plug 14a.

In the embodiment shown in the right-hand part of FIG. 3, plug 14a, container 14′a, gasket 18, tightening part 36, compression part 24a and the elastic O-ring 26 are arranged coaxially with respect to the opening 49 sealed by plug 14a.

The device shown in the left-hand part of FIG. 3 is more particularly suitable in the case when the container 14′b is of a larger size and particularly when the container is used for transporting irradiated nuclear fuel. The tightening means then comprise bolts 28 regularly distributed around the circumference of the opening formed in the container and whereof only one is shown in the drawing. These bolts pass through holes 30a formed in flange 16′a and holes 32a formed in compression part 24a, which is also shaped like a disk, as has been described with reference to the right-hand part of FIG. 3. However, the centering of part 24a, as well as that of ring 26, is brought about by an annular projecting portion 44a, which is fitted into the periphery of plug 14a. The elastic O-ring 26 is also placed in a slot 48 formed in compression part 24a.

In this latter embodiment of the device according to the invention shown in the left-hand part of FIG. 3, flange 16′a, cover 14a, gasket 18, compression part 24a and elastic O-ring 26 are arranged coaxially with respect to the axis of opening 49 of container 14′a.

In the joining device according to the invention described hereinbefore with reference to FIGS. 1 to 3, the characteristic curves of the variations of force Y applied as a function of the flattening e correspond to curve a of FIG. 4 for gasket 18 and curve b of FIG. 4 for elastic O-ring 26 or for elastic O-rings 26a. It can be seen that the steepness of the characteristic curve b of the flexible metal O-ring 26 or rings 26a is greater than that of the gasket, which is important for the satisfactory operation of the device according to the invention.

In practice, the tightening of the assembly is brought about by means of a not shown, auxiliary tightening system in the absence of actual tightening means (parts 22, 22′, bolts 28 or part 36). This tightening system can in particular comprise a jack, whose action is diagrammatically illustrated by arrows $F_1$ and $F_2$ in FIGS. 1 to 3. As can be seen, this jack acts simultaneously on the bearing faces 33, 33a of compression part 24, 24a (arrows $F_1$) and on the opposite bearing faces 35, 35a, 42 (arrows $F_2$). However, in the embodiments of FIG. 3, it is apparent that the bearing faces 35a and 42 can be located in a cavity containing container 14′a, in such a way that the jack then only acts on face 33a.

The tightening force $Y_2'$ applied in this way to the assembly by means of the auxiliary tightening jack is initially calculated so as to be equal to the tightening force $Y_2$ which it is desired to obtain, increased by a force making it possible to compensate the tensioning or subsequent elongation of tightening means 22, 22′, 28 or 36 of the joining device (cf FIG. 4). Thus, curve c of FIG. 4 shows the variation of force Y as a function of the flattening e resulting from the tightening force $Y_2'$ simultaneously applied to ring or rings 26, 26a respectively and to gasket 18. Curve c corresponds to the sum of the curves a and b up to the force $Y_2$, which it is desired to obtain. Deformation of gasket 18 is then prevented by portions 20, 20a or 52, in such a way that only the elastic O-ring 26 or O-rings 26a deform up to the total form applied $Y_2'$.

The tightening means (bolt 28, parts 22, 22′ part 36 or nut 45 only) can then be manually fitted without any force. The auxiliary tightening jack is then released in such a way that these tightening means are tensioned. In FIG. 4, curve d represents the corresponding decompression of the assembly, i.e. of joint 18 and ring or rings 26 or 26a respectively. It is apparent that, according to the invention, the elastic restoration or relaxation r of ring 26 or rings 26a leads to the compression of the tensioning of the tightening means leading to the reduction of the force applied to the assembly from the maximum value $Y_2'$ to the desired value $Y_2$.

The above description shows that the joining device according to the invention, as a result of the presence of the elastic O-ring 26 or rings 26a, makes it possible to very accurately apply a predetermined force $Y_2$ to the assembly and without the fitting of tightening means causing any particular problem. Moreover, the use of an elastic metallic O-ring makes it possible to not considerably increase the overall dimensions of the joining device and permits the use of the tightening method in virtually all industrial contexts.

What is claimed is:

1. A device for the tight joining of two parts comprising tightening means of the screw-nut type, which move the parts to be joined towards one another in order to compress at least one gasket between said parts, wherein the tightening means act on a stack comprising in order and in axial direction, relative to the parts to be joined, the first of the said parts, the gasket, the second of the parts to be joined, elastic means and a compression member, the rigidity of the elastic means being greater than that of the gasket, and abutment means being provided between said first and second parts to be joined to limit deformation of said gasket to a given value, in such a way that said stack can be tightened with the aid of auxiliary compression means prior to fitting of the tightening means, said elastic means compensating tensioning of the tightening means during slackening of the auxiliary compression means.

2. A device according to claim 1, wherein the elastic means comprise at least one elastic O-ring.

3. A device according to claims 1 or 2, wherein the tightening means comprise bolts passing through appropriate passages formed in the compression member and in at least one of the parts to be joined.

4. A device according to claim 3, wherein it comprises a single elastic means positioned coaxially with respect to the gasket.

5. A device according to claim 3, wherein it comprises a plurality of elastic means arranged coaxially around each bolt.

6. A device according to claims 1 or 2, wherein the tightening means comprise two annular parts, which cooperate with one another by a thread, the joining device comprises a single elastic means, the annular parts and the elastic means being arranged coaxially with respect to the gasket.

7. A device according to claims 1 or 2, wherein the tightening means comprise an annular part, which cooperates by a thread with one of the parts to be joined and the joining device comprises a single elastic means, the annular part and the elastic means being arranged coaxially with respect to the gasket.

8. A method for tightening a device for the tight joining of two parts, said device comprising tightening means of the screw-nut type, which move the parts to be joined towards one another in order to compress at least one gasket between said parts, said tightening means acting on a stack comprising in order and in axial direction relative to the parts to be joined, a first of said parts, said gasket, the second of said parts, elastic means and a compression member, the rigidity of the elastic means being at least equal to that of the gasket, wherein said method comprises the steps of tightening said stack prior to fitting said tightening means, by applying a total compressive stress corresponding to a given tightening force which it is desired to apply to said gasket, increased by a given force equal to a stress resulting from further tensioning of said tightening means after removal of said total compressive stress, fitting into tightening means, slackening said total compressive stress, whereby said total compressive stress is transferred to said tightening means, with the result that said elastic means are slightly relaxed and compensate tensioning of said tightening means, in such a way that said given tightening force is actually applied to said gasket.

* * * * *